United States Patent Office 3,424,090
Patented Jan. 28, 1969

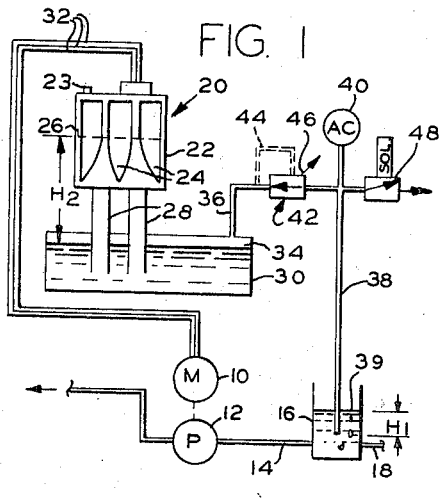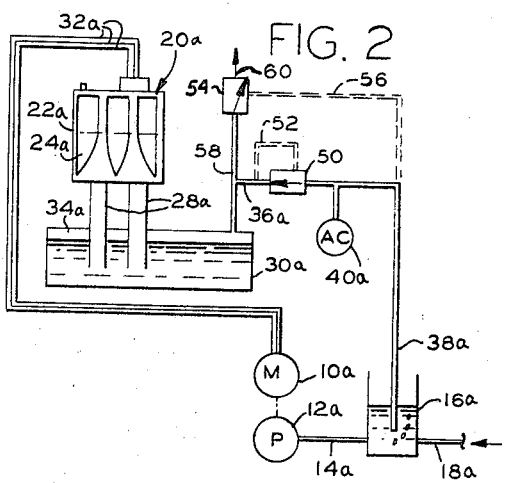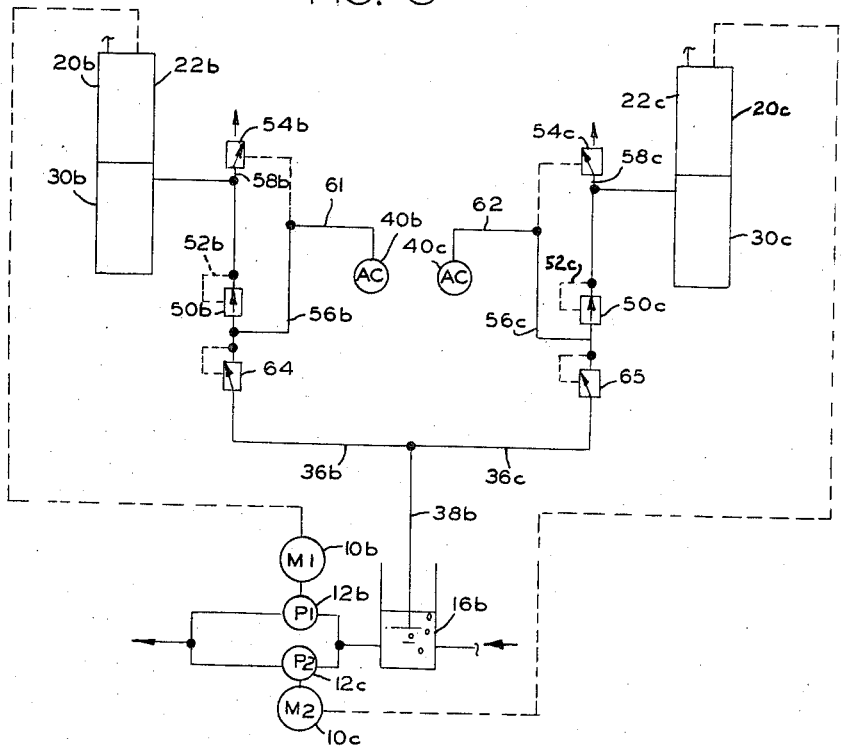

3,424,090
PNEUMATIC CONTROL SYSTEM AND VENT VALVE THEREFOR
Paul E. Hyde, Corvallis, Oreg., assignor to Flomatcher Co., Inc., Corvallis, Oreg., a corporation of Oregon
Filed June 26, 1967, Ser. No. 648,801
U.S. Cl. 103—35
Int. Cl. F04b 39/00; F16k 31/165
10 Claims

ABSTRACT OF THE DISCLOSURE

This application discloses a pneumatic control system for controlling the speed of an electric motor. In the illustrated embodiments the motor drives a pump in a fluid system including a sump. The control system itself includes a liquid rheostat which is electrically connected to the motor and in which the electrolyte level is determined by air pressure acting on the electrolyte. This air pressure is directly proportional to the static head of liquid in the sump. The liquid head is sensed by a bubbler tube which extends into the liquid into the sump and through which air generated by an air compressor is bubbled into the liquid. An air line transmits the air pressure in the bubbler tube, which is directly proportional to the liquid head in the sump, to the rheostat. Thus the depth to which the electrodes in the rheostat are immersed is directly proportional to the liquid head in the sump, and the speed of the motor varies with such head.

There is also a normally open positive purge valve in the air line which senses the air pressure at the rheostat and closes the air line to bubbler tube pressure when rheostat air pressure reaches a predetermined upper limit, so as to prevent the electrolyte from overflowing the rheostat. Any increase in bubbler tube pressure beyond this upper limit is thus isolated from the rheostat. A normally closed pneumatic vent valve is connected to rheostat air pressure in parallel with the purge valve. The vent valve is sensitive to bubbler tube pressure and opens when the bubbler tube pressure drops below rheostat air pressure so as to vent rheostat pressure to atmosphere. When rheostat pressure and bubbler tube pressure are again equalized, the purge valve reopens and the rheostat is once more responsive to bubbler tube pressure.

BACKGROUND OF THE INVENTION

Field of the invention

The present invention relates to a pneumatic control system and more particularly to a fluid pressure responsive pneumatic control system for controlling the speed of an electric motor and to a pneumatic pressure sensitive vent valve for such a system.

Description of the prior art

Pneumatic control systems responsive to fluid pressures for controlling the level of electrolyte in a liquid rheostat and thus the speed of an electric motor are well known. Such systems, as shown for example in Ryden U.S. Patent 3,021,789, have included a bubbler tube extending into the liquid in a sump so that an air pressure proportional to the pressure head of the liquid is produced in the bubbler tube, with this pressure being transmitted through an air line to a liquid rheostat. Also, as shown in Parks et al. U.S. Patent 3,213,795, such systems have included a so called positive purge valve in the air line for shutting off the air line when air pressure at the rheostat reaches a level at which the electrolyte threatens to overflow the electrode chamber.

Such a valve was commonly of the diaphragm type with rheostat air pressure acting on one side of the diaphragm against a constant pressure acting on the other side of the diaphragm to close the valve. Such valve also included an air bleed orifice on the rheostat side of the diaphragm to relieve rheostat pressure and thus permit the valve to reopen when bubbler tube pressure dropped below rheostat air pressure. However, the use of such an air bleed presented a problem in that it prevented such valve from ever closing entirely, even under abnormally high bubbler tube pressures because of the continual need for supplying makeup air from the bubbler tube side of the valve to the rheostat side. The result was that the rheostat air pressure was maintained at a certain ratio of the bubbler tube pressure, even when the valve was "closed," causing the rheostat to overflow nevertheless when bubbler tube pressure was exceptionally high.

SUMMARY OF THE INVENTION

The pneumatic control system of the persent invention overcomes the problem just described with prior art bubler tube control systems by (1) eliminating the air bleed orifice on the rheostat side of the positive purge valve so that such valve will close completely and thus prevent absolutely overflow of electrolyte during abnormally high bubbler tube pressure, and by (2) providing a second, air controlled vent valve connected to rheostat air pressure in parallel with the purge valve for relieving rheostat air pressure and reopening the purge valve when bubbler tube pressure returns to normal. The pneumatic vent valve also replaces the usual and costlier solenoid actuated vent valve in pneumatic control system for automatically venting the rheostat air when the system is shut down.

The pneumatic vent valve is of a unique construction which includes an internal diaphragm in communication at one side with bubbler tube pressure and at the other side with rheostat air pressure. Whenever bubbler tube pressure equals or exceeds rheostat air pressure, the diaphragm itself prevents the venting of rheostat air to atmosphere. However, when rheostat air pressure exceeds bubbler tube pressure, the diaphragm is flexed to a position permitting the venting of rheostat air pressure to atmosphere.

From the foregoing it will be apparent that the principal objects of the present invention are to provide:

(1) A new and improved pneumatic control system for a liquid rheostat which positively prevents the overflow of electrolyte from such rheostat when the control air pressure rises beyond its normal control range;

(2) A new and improved pneumatic vent valve for relieving air pressure at an air pressure controlled liquid rheostat whenever rheostat air pressure exceeds the control air pressure;

(3) A pneumatic vent valve in a control system as aforesaid which eliminates the need for an air bleed orifice for dissipating air pressure from the liquid rheostat;

(4) A pneumatic vent valve for a control system as aforesaid which eliminates the need for the more complex and expensive, solenoid-actuated vent valves of prior such systems; and (5) A pneumatic control system as aforesaid which is flexible, automatic, simplified and more fool-proof than prior such systems.

BRIEF DESCRIPTION OF THE DRAWINGS

FIG. 1 is a diagrammatic view of the prior art pneumatic control system utilizing a pneumatic purge valve having an air bleed orifice;

FIG. 2 is a diagrammatic view of a pneumatic control system in accordance with the present invention set up for controlling the speed of a pump motor in a sewerage system;

FIG. 3 is a diagrammatic view of a modified form of pneumatic control system in accordance with the present invention;

DETAILED DESCRIPTION

Prior art

Figure 4:
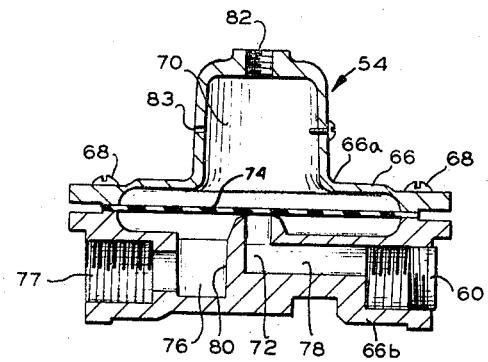
FIG. 4 is a midsectional view through a pneumatic vent valve in accordance with the present invention.

With reference to the drawings, FIG. 1 discloses a typical prior art pneumatic control system used for controlling the speed of an electric motor 10 which drives a pump 12 connected in a sewer discharge line 14 leading from a sump or wet well 16 into which an influence line 18 empties. The control system itself includes a liquid rheostat 20 including an electrode chamber 22 which is vented to atmosphere at 23 and contains a plurality of suitably separated and insulated electrodes 24 immersed in a liquid electrolyte 26 supplied through risers 28 from an air-sealed electrolyte reservoir 30. Motor 10 is typically of the wound rotor induction type, and the rheostat electrodes are connected in the rotor circuit by conductors 32. A rise in electrolyte level in the electrode chamber decreases the electrical resistance between electrodes and thus effects an increase in the speed of motor 10. The converse occurs upon a drop in the electrolyte level.

The upper end 34 of the electrolyte chamber is connected by an air line 36 to a bubbler tube 38 which projects at its lower end into the liquid 39 in sump 16. An air compressor 40 maintains a positive air pressure in the air line and bubbler tube, and keeps the tube purged of foreign matter that finds its way into the sump.

In the normal operating range of the pneumatic control system, the air pressure in bubbler tube 38, air line 36 and the upper end of the electrolyte chamber 34 will be proportional to the liquid pressure head H1 in the sump above the lower end of the bubbler tube. Thus the head H2 of electrolyte in the electrode chamber above the electrolyte level in the reservoir will correspond to the liquid head H1 in the sump. However, air line 36 contains a so-called positive purge valve 42, which is intended to limit the upper level of electrolyte in the electrode chamber 22 to prevent the overflow of electrolyte therefrom in the event bubbler tube pressure should rise to an unusually high value because of an unusually large head in the sump. Positive purge valve 42 is a diaphragm type valve which is connected on one side of the diaphragm by a pilot line 44 which senses rheostat air pressure so that when such pressure reaches a predetermined upper limit, it acts on the diaphragm to close the line 36 and thereafter prevent a bubbler tube pressure from effecting the pressure within the electrolyte reservoir.

However, the downstream side of valve 42 includes an air bleed orifice 46 which act to gradually dissipate reservoir air pressure. If it were not for bleed orifice 46, valve 42 would have no means of reopening after bubbler tube pressure drops back into its normal operating range. However, the constant dissipation of air through bleed orifice 46 prevents valve 42 from closing tightly because of the continual need to resupply air to the downstream side of the valve to make up for the air lost through the bleed orifice. Thus, even when valve 42 is "closed," reservoir air pressure remains a function of bubbler tube pressure, and when bubbler tube pressure is exceptionally high the electrode chamber will overflow despite valve 42. It is this defect in the pneumatic control system of FIG. 1 which the present invention is intended to overcome.

A solenoid actuated vent valve 48 is connected to bubbler tube and reservoir pressure, and opens when motor 10 and air compressor 40 shut down to vent the entire system to atmosphere.

FIG. 2 form

Referring now to FIG. 2 showing a pneumatic control system in the same setting as FIG. 1, but modified in accordance with the present invention, such system includes signal generating means comprising a liquid rheostat 20a similar to the one of the prior art and used to control a similar motor 10a and pump 12a in a sewage line 14a including a sump 16a and influent line 18a. However the pneumatic control circuit is modified considerably, although it does include a gas pressure producing means including the basic bubbler tube fluid pressure sensing means 38a, air compressor 40a providing a source of gas pressure and air line 36a serving as a primary passage means connecting the bubbler tube to the upper end of electrolyte reservoir 30a as used in the prior art system.

A first normally open valve means comprising a positive purge valve 50 replaces the corresponding valve 42 of the prior system and differs from the prior corresponding valve 42 in that the bleed orifice 46 on the downstream side of the valve is eliminated. Nevertheless valve 50 senses downstream air pressure through a pilot line 52, which communicates with one side of a diaphragm within the valve housing. Thus when air pressure in the electrolyte reservoir reaches a predetermined maximum at which the electrolyte threatens to overflow the electrode chamber due to a rise in bubbler tube pressure, valve 50 closes tightly to isolate the reservoir from further increases in bubbler tube pressure. The elimination of all bleed orifices downstream from valve 50 maintains valve 50 in a tightly closed condition so long as bubbler tube pressure remains higher than reservoir air pressure, and therefore overflow of the electrode chamber is prevented.

However, with valve 50 in the air line, other means must be provided for relieving air pressure at the electrolyte reservoir when bubbler tube pressure drops back into its normal operating range, so that valve 50 can reopen and the electrolyte level can once again fluctuate with the liquid level in the sump. Such means includes a second normally closed valve means comprising a pneumatic vent valve 54 which is connected to reservoir 30a in parallel with purge valve 50 by a bypass line 58. Vent valve 54 is a diaphragm type valve which has one side of the diaphragm connected by a pilot line 56 to air source 40a and bubbler tube pressure. The other side of the diaphragm is in communication with reservoir air pressure through bypass line 58.

The vent valve also includes an exhaust port 60 which remains closed by the diaphragm so long as bubbler tube pressure, or pressure upstream from valve 50, equals or exceeds reservoir air pressure, that is pressure downstream from valve 50. However, when reservoir air pressure exceeds bubbler tube pressure, as when bubbler tube pressure returns from an unusually high level to its normal range, exhaust port 60 opens to relieve reservoir air pressure and remains open until the pressures on the reservoir side and bubbler tube side of valve 54 are equalized. When this occurs, pressures on the opposite sides of valve 50 are also equalized, permitting such valve to reopen and thereby permitting the level of electrolyte in the rheostat once again to fluctuate with the liquid level in the sump.

Valve 54 also opens to exhaust whenever air compressor 40a and the fluid pumping system shut down. This will cause the level of electrolyte in the electrode chamber to drop to its lower limit level so that motor 10a will be restarted at high resistance and therefore low speed.

FIG. 3 form

FIG. 3 illustrates by means of a simple single line diagram a pneumatic control system of the invention utilizing dual liquid rheostats 20b and 20c and dual air compressors 40b and 40c, with a single bubbler tube 38b. A pair of air lines 36b, 36c extend from the bubbler tube, one to each of the liquid rheostats 20b, 20c. These rheostats may be of the same construction as those in FIGS. 1 and 2 and include electrode chambers 22b, 22c and electrolyte reservoirs 30b and 30c, respectively.

The parallel air lines have positive purge valves 50b, 50c, respectively, corresponding to the valve 50 of FIG. 2 and sensitive to downstream air pressure through pilot lines 52b, 52c to close such valves when the downstream air pressure reaches a predetermined upper limit. Bypass lines 56b, 56c corresponding to line 56 of FIG. 2 extend from the upstream sides of valves 50b and 50c to one side of the diaphragms in pneumatic vent valves 54b, 54c, corresponding to the valve 54 of FIG. 2. The other side of the diaphragms of such vent valves is connected by lines 58b, 58c to the electrolyte reservoirs 30b, 30c. Each of the parallel air systems has its own air compressor 40b, 40c which is connected by a line 61, 62, respectively, to the main air line 36b, 36c upstream from the corresponding purge valve 50b, 50c. Each air compressor also is in communication with the upstream side of the associated vent valve 54b, 54c through the bypass line 56b, 56c.

Thus the level of electrolyte in both rheostats 20b, 20c is controlled through a single bubbler tube 38 in exactly the same manner as described with respect to the single rheostat 20a of FIG. 2. The purge valves and vent valves in both systems function the same.

A typical application of the dual rheostat system is in the control of a pair of motors 10b, 10c driving pumps 12b, 12c used to pump sewage from a wet well 16b. Motor 10b is set to operate alone under normal loads whereas motor 10c is set to start up when the load in wet well 16b is more than pump 12b can handle alone. Thus the control system represented by rheostat 20c only functions part of the time, when motor 10c and air compressor 40c are operating. Therefore pressure sensitive valves 64, 65 are placed in lines 36b, 36c, respectively, upstream toward the bubbler tube from the purge valves and vent valves to prevent the cross flow of air pressure from one of the dual systems to the other when one of such systems is shut down. Otherwise, air pressure generated by the operating one of the systems would be dissipated through the vent valve of the nonoperating system. Valves 64 and 65 are normally closed and set to open only when the associated air compressor builds up the pressure on the air compressor side of each such valve to equal or exceed the pressure on the bubbler tube side thereof.

*Pneumatic vent valve*

FIG. 4 illustrates the details of a pneumatic vent valve 54 suitable for use in the pneumatic control system of FIGS. 2 and 3. Such valve includes a valve housing 66 including an upper section 66a and a lower section 66b fastened together by machine screws 68. The interior of the housing is divided into an upper chamber 70 and a lower chamber 72 by a diaphragm 74 of rubber or other impervious elastic material. The lower housing portion defines a first interior passage 76 extending inwardly from a first valve port 77 and a second interior passage 78 extending outwardly of the housing through a second, screened port 60. The first and second interior passages 76 and 78 are normally separated from one another by an interior wall 80 and the diaphragm 74 when the diaphragm is in a normal unflexed condition. The upper chamber 70 includes a third port 82 and an air bleed orifice 83.

Referring again to FIG. 2, the first port 77 is connected by line 58 to the upper end of the electrolyte reservoir 34a. The second port 60 is the exhaust port of FIG. 2 in communication with the atmosphere. The third port 82 is connected to the pilot control line 56 and is also therefore in communication with the air compressor 48 and the bubbler tube. From FIG. 4 it will be apparent that when bubbler tube pressure acting on the upper side of diaphragm 74 equals or exceeds reservoir pressure acting on the underside of diaphragm 74, the diaphragm will cut off communication between first passage 76 and second passage 78 thereby preventing the exhaust of reservoir air through port 60. However, when the reservoir pressure acting on the underside of diaphragm 74 exceeds bubbler tube pressure acting on the upper side of such diaphragm, the diaphragm will be flexed upwardly permitting electrolyte reservoir air to be exhausted through passage 78 and exhaust port 60 to atmosphere until such time as the pressures on the opposite sides of the diaphragm are equalized. When this occurs, passage 78 recloses and purge valve 50 reopens to permit the level of electrolyte in the rheostat to vary in response to changes in the level of liquid in sump 16a. Bleed orifice 83 relieves pressure in the air lines between the valves and the bubbler tube when the system is shut down. Obviously this bleed orifice could be provided at any point upstream from the vent valve.

*Positive purge valve*

Figure 5:
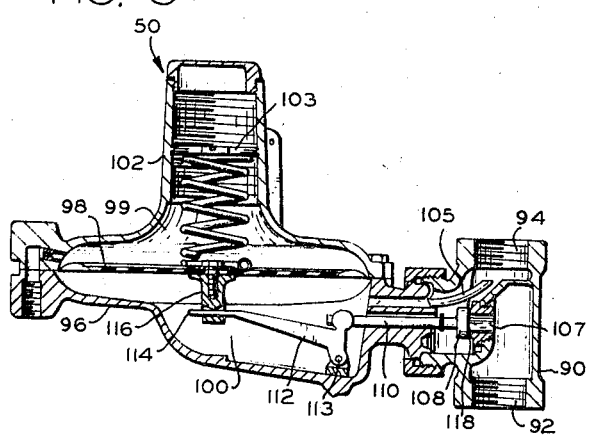
FIG. 5 is a midsectional view through a positive purge valve as used in the control system of the present invention.

FIG. 5 illustrates a positive purge valve 50 of a type suitable for use in the pneumatic control circuits of FIGS. 2 and 3. Such valve includes a valve body 90 having a first port 92 in communication with bubbler tube pressure and a second port 94 in communication with electrolyte reservoir pressure. The valve body is connected to a diaphragm housing 96. A diaphragm 98 divides the interior of the housing into an upper, spring chamber 99 and a lower air chamber 100. A coil compression spring 102 engages at one end a center portion of the diaphragm and at its opposite end an adjustable spring seat 103.

A pitot tube 105 connects the lower side of the diaphragm to port 94 so that reservoir air pressure will be transmitted to the lower side of the diaphragm. Valve port 94 is normally connected to valve port 92 through an internal passage 107. However passage 107 can be closed by a valve disc 108 which is attached to the outer end of reciprocating valve stem 110 forming part of an actuating linkage. This linkage includes a lever 112 pivoted at 113 and connected at 114 to a pusher post 116 projecting downwardly from the underside of the diaphragm 98.

The force of spring 102 is selected so that, in the normal range of bubbler tube pressures, valve passage 107 will remain open to transmit bubbler tube pressures to the electrolyte reservoir. However, when reservoir air pressure reaches its upper limit valve selected to prevent overflow of electrolyte from the electrode chamber, reservoir air pressure acting on the lower side of the diaphragm 98 through pitot tube 105 flexes diaphragm 98 upwardly against the force of spring 102. This causes lever 112 to fulcrum about pivot 113 and push valve stem 110 toward the right, forcing valve disc 108 against valve seat 118 to block valve passage 107 and thereby cut off the electrolyte reservoir from bubbler tube pressure. Thereafter, passage 107 cannot be reopened until the air pressure acting on the underside of the diaphragm is relieved through the pneumatic vent valve previously described.

The positive purge valve 50 as thus described is very similar to the prior art type of purge valve 42 used in the control system of FIG. 1 except for the absence of an air bleed orifice in valve 50. In the prior art valve such an orifice bled air from the lower side of the diaphragm housing so that valve disc 108 was always slightly unseated from seat 118 to permit makeup air from the bubbler tube to leak through the valve to the electrolyte reservoir. The absence of such an orifice in valve 50, as previously mentioned, insures that valve disc 108 will remain in firm abutment against valve seat 118 so long as bubbler tube pressure exceeds the upper limit pressure of the reservoir.

*Operation*

With reference to FIG. 2, a summary of the operation of the pneumatic control system is as follows:

With motor 10a and air compressor 40a deenergized, air pressure in all sections of the air lines on both sides of both valves is equal and substantially at atmospheric pressure. Purge valve 50 is open and vent valve 50 closed. When the air compressor and motor are started, air pressure builds up in bubbler tube 38a, line 36a, and pilot lines 52 and 56 until such pressure corresponds to the pressure head in wet well 16a. This air pressure is transmitted to the top of the electrolyte reservoir 30a so that the electrolyte level in the electrode chamber matches the liquid level in the wet well. The overall effect of this is to regulate the speed of the motor to meet the demands of the liquid pumping system. So long as the pressure head in the wet well does not increase beyond a point at which electrolyte threatens to overflow the electrode chamber, purge valve 50 remains open and vent valve 54 remains closed, and the electrolyte level continues to match the level of liquid in the wet well.

However, when the pressure head in the wet well exceeds this point, due perphaps to a surge of influent from line 18a, the corresponding increase in reservoir air pressure sensed through pilot line 52 closes purge valve 50 tightly to prevent any further increase in air pressure at the reservoir. Vent valve 54 remains closed under these conditions to keep the electrolyte in the electrode chamber at a high level. Thus motor 10a operates at high speed while valve 50 remains closed so that its pump can handle the increased demand. When the pressure head in the wet well finally returns to a more normal level, bubbler tube pressure also drops. Eventually reservoir pressure exceeds bubbler tube pressure, and when this occurs, vent valve 54 opens to again equalize the bubbler tube and reservoir pressures. When the pressures are equalized, purge valve 50 reopens, and once again the electrolyte level in the rheostat will be responsive to changes in the liquid level in the wet well.

When the air compressor and motor 10a are stopped, the pneumatic vent valve 54 opens because of a drop in air pressure in line 56. The vent valve remains open until air pressure at the electrolyte reservoir matches the substantially atmospheric pressure at the bubbler tube.

Although the invention has been described in conjunction with a sewage pumping system, the pneumatic control system of the present invention could be used in any application where it is desired to change an output signal of a rheostat or other signal generating means in response to changes in a fluid pressure. For example, the control system could be used to control the speed of a pump motor in a municipal water distribution system where it is desired to maintain a constant water pressure in the system. In such cases the fluid pressure sensing means would be connected to the discharge side of the pump to maintain a predetermined fluid pressure at this point. No doubt other applications will occur to those in the art.

Having illustrated several preferred forms of the invention, it will be apparent to those having ordinary skill in the art that the same permits of modification in arrangement and detail and applictaion. I claim as my invention all such modifications as come within the true spirit and scope of the following claims.

I claim:

1. A pneumatic control system for producing a control signal proportional to the pressure of a fluid comprising:
   gas pressure producing means including a source of gas pressure and fluid pressure sensing means sensing the pressure of said fluid and producing a gas pressure proportional to the pressure of said fluid,
   signal generating means for producing signal changes in response to changes in the pressure of a gas,
   primary passage means for transmitting said gas pressure from said producing means to said generating means so that changes in signals produced by said generating means are normally proportional to changes in said gas pressure,
   first normally open valve means in said passage means including means responsive to downstream gas pressure between said signal generating means and said valve means for completely closing said valve means and preventing transmission of gas pressure from said producing means to said generating means when the downstream gas pressure reaches a predetermined upper limit value,
   and second normally closed valve means connected to said generating means in parallel with said first valve means, said second valve means including means responsive to upstream gas pressure between said first valve means and said pressure producing means for opening said second valve means to relieve said downstream gas pressure and reopen said first valve means when said upstream pressure drops below said downstream pressure.

2. A system according to claim 1 wherein said signal generating means comprises a liquid rheostat including a gas ventilated electrode chamber and a gas sealed electrolyte reservoir in communication with said primary passage means,
   and bypass passage means bypassing said first valve means and being in communication with said electrolyte reservoir and said gas producing means,
   said second valve means being in said bypass passage means and preventing the transmission of gas pressure between said producing means and said electrolyte reservoir through said bypass passage means and venting said electrolyte reservoir to atmosphere when the gas pressure at said reservoir exceeds the gas pressure generated by said producing means.

3. A system according to claim 1 wherein said fluid is in a fluid system including a pump and a variable speed motor driving said pump, and wherein said signal generating means comprises a liquid rheostat operatively connected to said motor whereby changes in said fluid pressure effect a proportional change in the speed of said motor and therefore the displacement of said pump.

4. A system according to claim 1 wherein said fluid is in a fluid system including a sump, a pump downstream from said sump for regulating the level of fluid in said sump and a motor for driving said pump,
   said pressure sensing means including a bubbler tube extending into said sump and connected to a source of air pressure,
   said signal generating means comprising a liquid rheostat including an electrode chamber with electrodes electrically connected to said motor for controlling the speed thereof and a variable level of electrolyte at least partially immersing said electrodes,
   said gas pressure producing means producing a gas pressure directly proportional to the pressure head of liquid in said sump whereby upon an increase in liquid head in said sump, said gas pressure will be increased to increase proportionally the immersion of the electrodes in said chamber and therefore the speed of said motor.

5. A system according to claim 1 wherein said gas pressure producing means includes an air pressure source in communication with said fluid sensing means and the upstream side of said first and second valve means.

6. A system according to claim 1 including a variable speed motor,
   said signal generating means including a liquid rheostat and means electrically connecting said rheostat to said motor,
   said gas pressure producing means including an air compressor supplying air to said pressure sensing means and the upstream side of said first and second valve means.

7. A system according to claim 1 including a single pressure sensing means,
   said signal generating means including a pair of liquid rheostats connected in parallel to said single pressure sensing means by a pair of separate branch passages of said primary passage means,
   said first valve means including a pair of first valves, one in each of said pair of branch passages,
   said second valve means including a pair of second valves, each connected in parallel with a different one of said pair of first valves.

8. A system according to claim 7 wherein said gas pressure producing means includes a pair of air pressure sources, each connected to said pressure sensing means and to the upstream side of different ones of said first and second valves.

9. A system according to claim 8 including third valve means between said pressure sensing means and said pairs of first and second valves and preventing the transmittal of gas pressure between the separate branchs of the system when one of said pair of air pressure sources is inoperative.

10. A system according to claim 1 wherein said second valve means includes a valve housing, a flexible imperforate diaphragm dividing the interior of said housing into first and second chambers, said first chamber including first and second flow passages, said first passage being in communication with the gas pressure at said signal generating means, said second passage being in communication with atmosphere, said first and second passages being separated from one another by said diaphragm when the gas pressures on the opposite sides of said diaphragm are equal and when the pressure on the second chamber side of said diaphragm exceeds the pressure on the first chamber side thereof, but being in communication with one another when the pressure on the first chamber side of said diaphragm exceeds the pressure on the second chamber side thereof, said second chamber being in communication with gas pressure upstream from said first valve means so that when the gas pressure downstream from said first valve means exceeds the gas pressure upstream from said first valve means, said downstream gas pressure will be exhausted to atmosphere through the first and second passages of said second valve means.

References Cited

UNITED STATES PATENTS

| | | | |
|---|---|---|---|
| 2,734,458 | 2/1956 | Hayes | 103—35 |
| 2,956,581 | 10/1960 | Pearson | 137—394 X |
| 3,021,789 | 2/1962 | Ryden | 103—35 |
| 3,123,005 | 3/1964 | Bredehoeft et al. | 103—35 |
| 3,213,795 | 10/1965 | Parks et al. | 103—35 |
| 3,263,616 | 8/1966 | Hyde | 103—35 |
| 3,360,002 | 12/1967 | Weis et al. | 137—394 X |
| 3,279,001 | 10/1966 | Lenz | 137—394 |

DONLEY J. STOCKING, *Primary Examiner.*

WARREN J. KRAUSS, *Assistant Examiner.*

U.S. Cl. X.R.

137—394, 403

UNITED STATES PATENT OFFICE
CERTIFICATE OF CORRECTION

Patent No. 3,424,090　　　　　　　　　　　　　　　　　　　January 28, 1969

Paul E. Hyde

It is certified that error appears in the above identified patent and that said Letters Patent are hereby corrected as shown below:

Column 1, line 21, "into", second occurrence, should read -- in --. Column 2, line 17, "persent" should read -- present --. Column 3, line 14, "influence" should read -- influent --; line 51, "effecting" should read -- affecting --; line 54, "act" should read -- acts --. Column 6, line 69, "vent valve 50" should read -- vent valve 54 --. Column 7, line 47, "application" should read -- application --. Column 9, line 6, "branchs" should read -- branches --.

Signed and sealed this 24th day of March 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents